(12) United States Patent
Alammari

(10) Patent No.: US 8,988,043 B2
(45) Date of Patent: Mar. 24, 2015

(54) CELL PHONE CHARGER

(71) Applicant: Fahad Mohammed Alammari, Bristol, RI (US)

(72) Inventor: Fahad Mohammed Alammari, Bristol, RI (US)

(*) Notice: Subject to any disclaimer, the term of this patent is extended or adjusted under 35 U.S.C. 154(b) by 336 days.

(21) Appl. No.: 13/722,371

(22) Filed: Dec. 20, 2012

(65) Prior Publication Data

US 2014/0176071 A1    Jun. 26, 2014

(51) Int. Cl.
    *H02J 7/00*    (2006.01)

(52) U.S. Cl.
    CPC . *H02J 7/00* (2013.01); *H02J 7/0029* (2013.01)
    USPC .......................................... 320/111; 320/114

(58) Field of Classification Search
    None
    See application file for complete search history.

(56) References Cited

U.S. PATENT DOCUMENTS

| 3,754,205 A * | 8/1973 | Lenkey .......................... 439/141 |
| 5,518,411 A | 5/1996 | Belleci |
| 6,540,533 B1 | 4/2003 | Schreiber |
| 6,986,067 B2 * | 1/2006 | Odaohhara et al. ........... 713/320 |
| 7,254,005 B2 * | 8/2007 | Oyama .......................... 361/220 |
| 8,339,098 B2 * | 12/2012 | Zhang ........................... 320/114 |
| 2010/0225273 A1 * | 9/2010 | Eastlack ....................... 320/108 |

FOREIGN PATENT DOCUMENTS

| CN | 2914451 Y | 6/2007 |
| CN | 201374578 Y | 12/2009 |
| GB | 2448330 B | 6/2010 |

* cited by examiner

*Primary Examiner* — Leigh Garbowski
(74) *Attorney, Agent, or Firm* — Oblon, McClelland, Maier & Neustadt, L.L.P.

(57) ABSTRACT

A cell phone charger that charges a cell phone and includes: prongs that are retractable and are plugged into an electrical outlet, a prong base that the prongs are assembled on, a rack gear that is connected to the prong base and has a rack gear hole, an extension gear that is engaged with the rack gear and is rotated to move the rack gear between a retracted position and an extended position, a spring that provides a force to place the rack gear and prongs is the retracted position, a retraction activator that controls a lock pin based on a retraction signal, a controller that generates the retraction signal and transmits the retraction signal to the retraction activator, and a voltage converter that converts provides a DC voltage and charges the cell phone.

20 Claims, 12 Drawing Sheets

CELL PHONE CHARGER

GRANT OF NON-EXCLUSIVE RIGHT

This application was prepared with financial support from the Saudi Arabian Cultural Mission (SACM), and in consideration therefore the present inventor has granted The Kingdom of Saudi Arabia a non-exclusive right to practice the present disclosure.

BACKGROUND

Field of the Disclosure

The present application relates to a cell phone charger, and more particularly, relates to a cell phone charger that can physically remove itself or unplug itself from the electrical outlet.

BRIEF SUMMARY

A cell phone charger is described that includes a plurality of conductive prongs that are configured to be plugged into an electrical outlet to provide an electrical connection between the cell phone charger and an AC power source, the plurality of prongs being retractable prongs, a prong base on which the plurality of prongs are disposed, the prong base being made of an electrical insulator, a rack gear that is connected to the prong base having a rack gear hole, an extension gear that is engaged with the rack gear, the extension gear is rotated to move the rack gear between a retracted position and an extended position, a spring that is connected to the rack gear at one end and to a spring base at another end, and that provides a force to place the rack gear in the retracted position, a lock pin that is positioned to be engaged with the rack gear hole and lock the rack gear in the extended position, a retraction activator that controls the lock pin based on a retraction signal, a controller that generates the retraction signal and transmits the retraction signal to the retraction activator, and that detects a charging status of the cell phone, and a voltage converter that converts an AC voltage from the AC power source to a DC voltage and charges the cell phone with the DC voltage when the plurality of conductive prongs are plugged into the electrical outlet.

DETAILED DESCRIPTION

Figure 1:
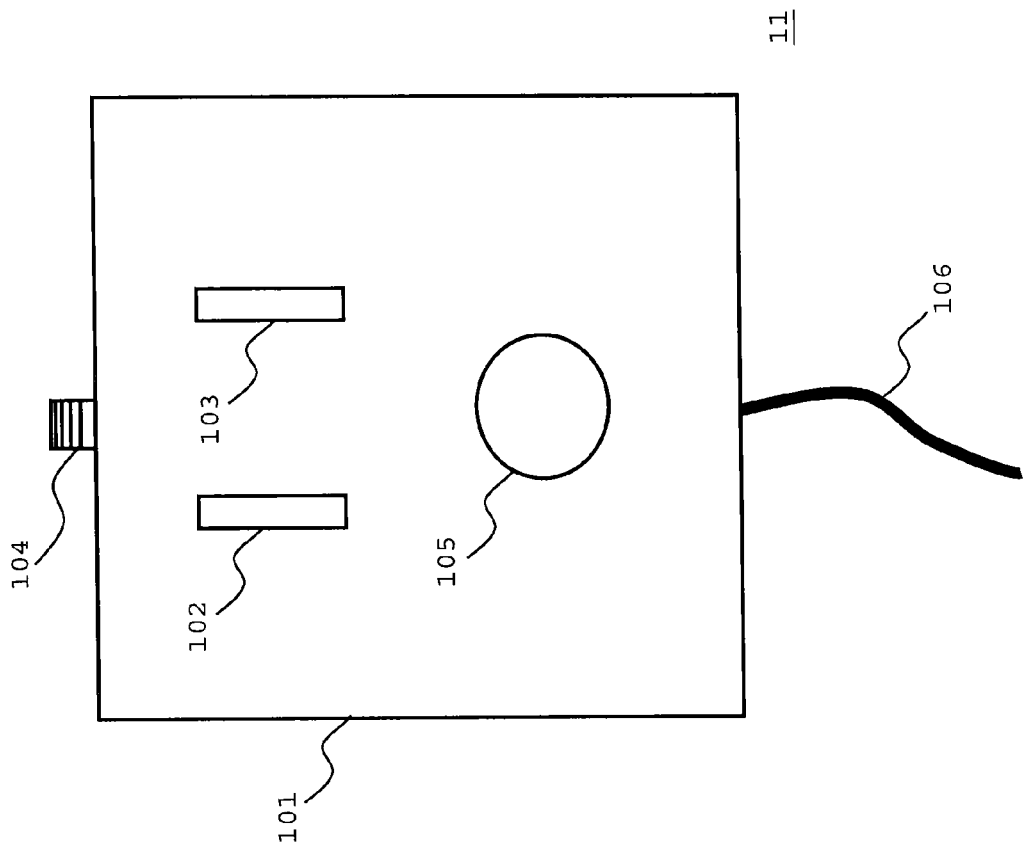
FIG. 1 is a front view of an exemplary embodiment of a cell phone charger with a prong retraction mechanism in accordance with present application.

FIG. 1 is a front view of a cell phone charger 11 according to the first exemplary embodiment of the present application. The cell phone charger 11 with a prong retraction mechanism can be plugged into an electrical outlet, and can be used to charge a cell phone. The cell phone charger 11 can physically remove itself, or unplug itself, from the electrical outlet when one or more situations occur. Examples of the one or more situations include, but are not limited to, the cell phone having been fully charged, a predetermined period of time having been passed, and/or a predetermined threshold temperature or humidity having been detected.

FIG. 1 shows the cell phone charger 11 that includes a prong retraction mechanism. The cell phone charger 11 includes a charger body 101, a charger cable 106, a hot prong 102, a neutral prong 103, a ground prong 105, and an extension gear 104. The charger cable 106 connects the cell phone charger 11 to a cell phone to provide electrical power from the cell phone charger 11 with a predetermined direct current (DC) voltage to the cell phone that needs to be charged. The predetermined DC voltage may be adjusted for different types of cell phones. The hot prong 102, the neutral prong 103, and the ground prong 105 (hereinafter, collectively referred to as the prongs) are inserted into an electrical plug that provides an alternating current (AC) electrical power to the cell phone charger 11. The charger body 101 is a main frame of the cell phone charger 11 and all of the components of the cell phone charger 11 are assembled on/in the charger body 101.

It should be noted that, in this application, the hot prong 102, the neutral prong 103, and the ground prong 105 are illustrated based on NEMA 5-15 plug standard that is used in North America, however, the functionality of the cell phone charger 11, as described in this application, is independent of a type of plug and a type of electrical outlet. For example, the charger may have two or more prongs that are inserted to an electrical outlet, and may use any of the NEMA prong standards. Further, any other plug standards used in other countries are also in the scope of the present application and a functionality of the cell phone charger is independent of a plug standard.

Figure 2:
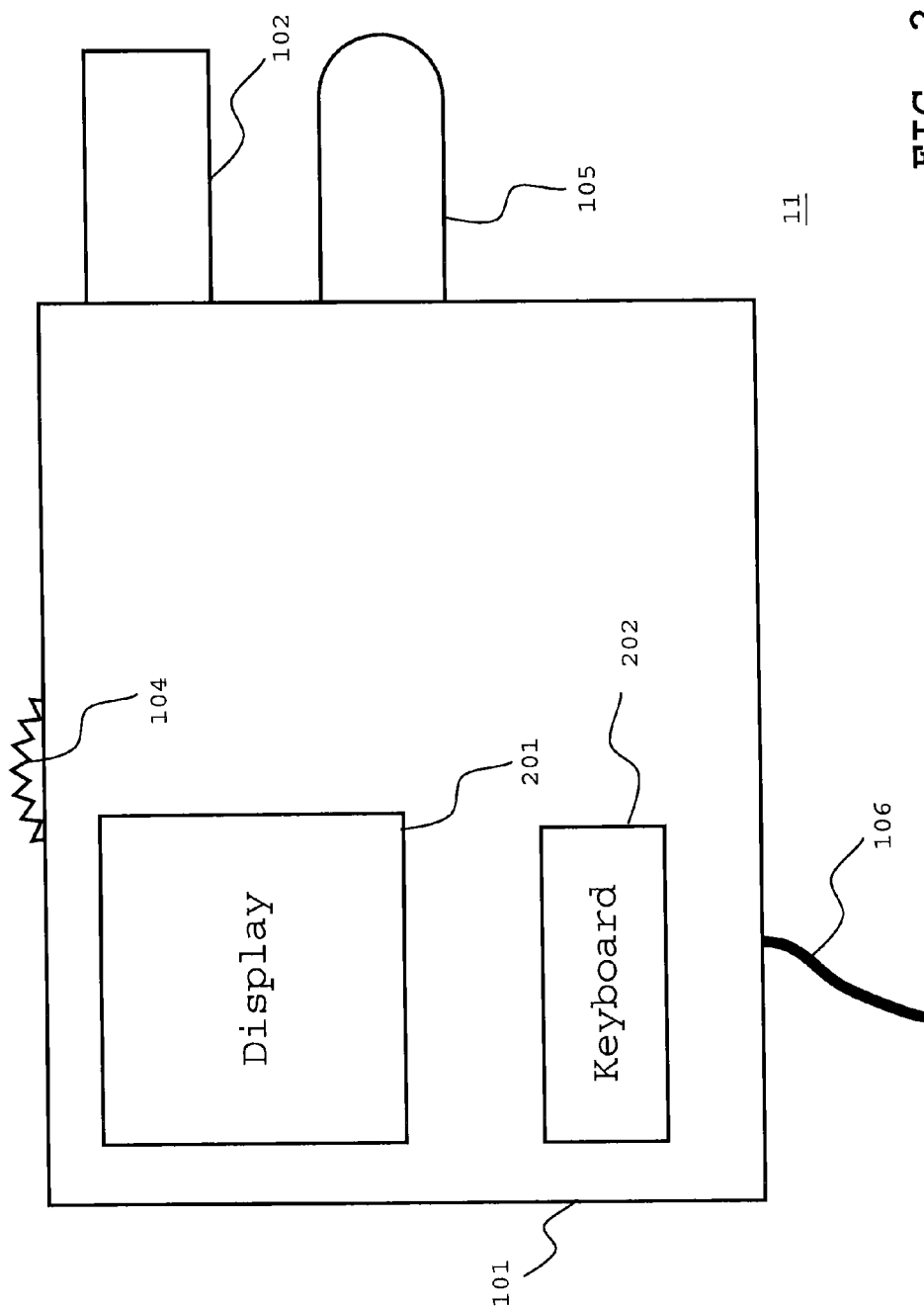
FIG. 2 is a side view of an exemplary embodiment of a cell phone charger with a prong retraction mechanism in accordance with present application.

FIG. 2 is a side view of an exemplary embodiment of the cell phone charger 11 with a prong retraction mechanism. A display 201 and a keyboard 202 are assembled on the charger body 101. The keyboard 202 can be used to set and modify a plurality of settings that control a cell phone type (a cell phone to be charged) or an unplugging settings (settings that control when the cell phone charger may be unplugged) of the cell phone charger 11. The display 201 may be used to display the plurality of settings of the cell phone charger 11. It should be noted that the display 201 and the keyboard 202 can be replaced by a touch screen display that can act as both a keyboard and a screen.

Figure 3:
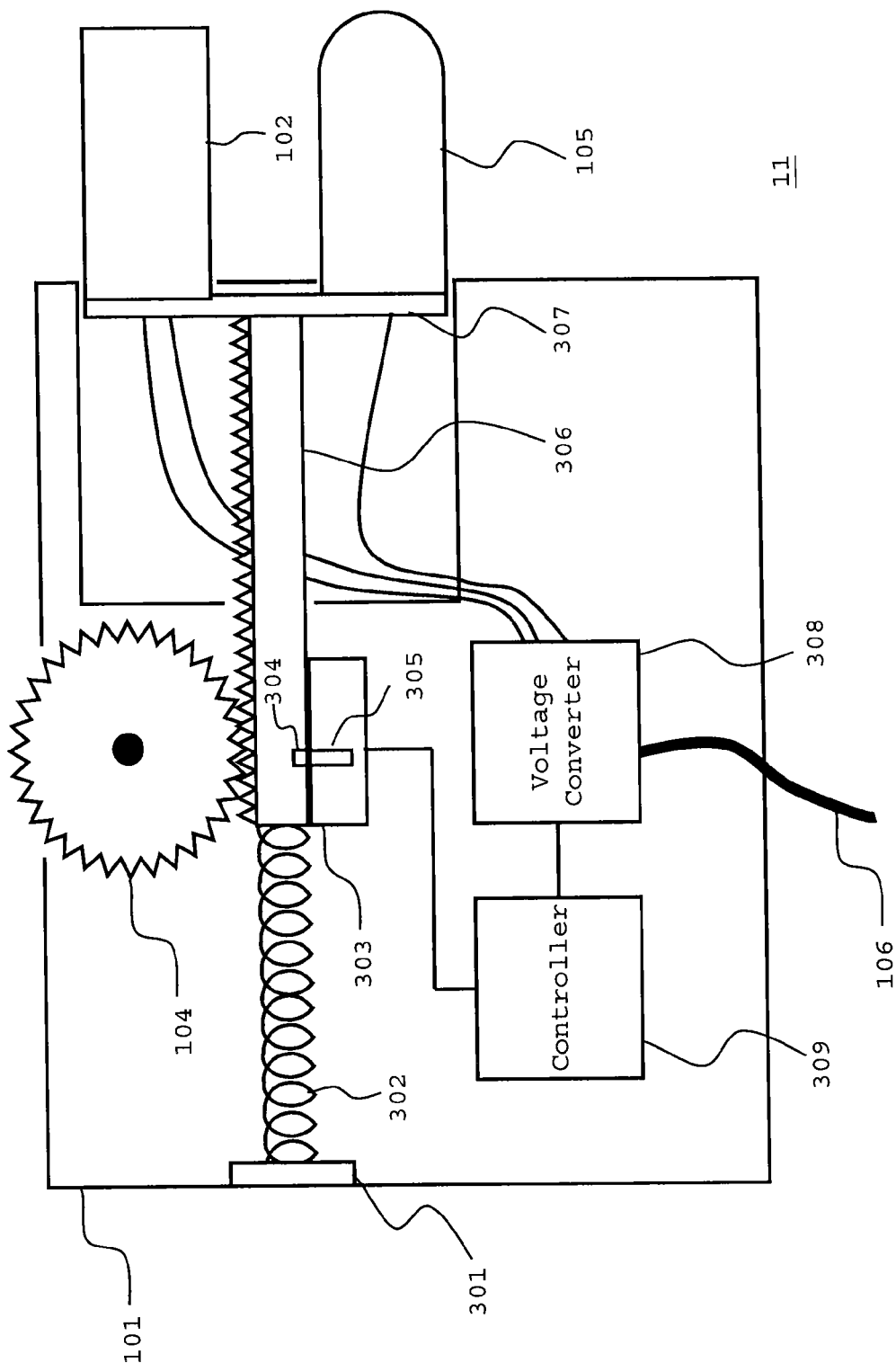
FIG. 3 is a cross sectional side view of an exemplary embodiment of a cell phone charger with a prong retraction mechanism in a fully extended position in accordance with present application.

FIG. 3 is a cross sectional side view of an exemplary embodiment of the cell phone charger 11 with a prong retraction mechanism in a fully extended position. The hot prong 102, the neutral prong 103, and the ground prong 105 are installed on a prong base 307. The prong base 307 is made of an electrical insulator. The prong base 307 is connected to a rack gear 306. The rack gear 306 can be extended using the extension gear 104. A rack gear spring 302 is connected to the rack gear 306 at one end and to a spring base 301 at the other end. The spring base 301 fixes the other end of the rack gear spring 302 to the charger body 101. When the rack gear 306 is in the extended position, i.e. the prongs are outside of the charger body 101, the rack gear spring 306 pulls back the rack gear 306 to place the prongs and the rack gear 306 in the retracted position. The rack gear 306 includes a rack gear hole 304 as shown in FIG. 3.

A voltage converter 308 is connected to the prongs via a plurality of cables/connectors. The voltage converter receives the electrical power from the prongs and converts the AC power to a DC power that can be used by a cell phone that is connection to the charger cable 106 for charging. The voltage converter 308 can further include a rectifier and analog circuitry to convert AC voltage to DC voltage. Optionally, a digital pulse width modulated AC/DC converter may be used. Although the term "cell phone" is used in this disclosure, it relates more generally to any device that is charged with a DC power supply. Also, smart phones, such as an iPhone, are considered to be a cell phone, or a mobile phone. The charger cable 106 connects the voltage converter 308 to a cell phone. Additionally, the voltage converter 308 may provide the electrical power for operation of a controller 309 of the cell phone charger 11. The controller 309 can control a retraction activator 303. The retraction activator 303 includes a lock pin 305. The lock pin 305 is an electrically or an electromechanically controlled pin that can be engaged with the rack gear hole 304 of the rack gear 306. When engaged with the rack gear hole 304, the lock pin 305 may lock movement of the rack gear 306. It should be noted that this exemplary embodiment provides an advantage that the prongs of the cell phone charger 11 are always covered by the charger body 101 and can not be touched during the unplugging (retraction of the prongs) because the charger body 101 is not separated from an electrical outlet during the unplugging until the prongs are fully retracted. This helps to prevent electrical shock as a result of the prongs being touched while the unplugging of the cell phone charger 11.

The following description covers an operation of the cell phone charger 11. When the cell phone charger 11 is in the fully extended position, the prongs can be inserted into an electrical outlet (not shown). In the fully extended position, the lock pin 305 of the retraction activator 303 is engaged with the rack gear hole 304 and prevents movement of the rack gear 306. As such, the cell phone charger 11 can be used as a normal plug because the prongs are locked and they are in the fully extended position. In the fully extended position, the gear rack spring 302 generates a force to pull the rack gear 306 in order to retract the rack gear 306. However, since the lock pin 305 is engaged with the rack gear hole 303, the rack gear 306 is locked and may not move. Therefore, the prongs, which are connected to the rack gear 306, remain in the fully extended position.

The lock pin 304 may be released only when the retraction activator 303 receives a retraction signal from the controller 309 and unlocks the lock pin 305. The controller 309 may generate the retraction signal to unplug or disconnect the cell phone charger 11 from the electrical outlet. The retraction signal may be generated, for example, when a cell phone that is being charged with the cell phone charger 11 is fully charged or charged to a predetermined level, such as % 80, % 90, or % 95. Also, the retraction signal may be generated when a hazardous situation occurs. For example, the retraction signal may be generated when an electrical circuit of the cell phone charger 11 is short circuited, when a temperature of the cell phone charger 11 increases above a predetermined temperature (such as 150° C., 160° C., 170° C., or higher), or when a water spill is detected by a water sensor connected to or incorporated in the controller 309 of the cell phone charger 11. Additionally, the retraction signal may be generated when a predetermined period of time is passed since the charger was first plugged into an electrical outlet. For example, the retraction signal may be generated when the cell phone charger 11 stays plugged or connected to an electrical outlet for few hours (1, 2, 3, 4, 5, or 6 hours for example) or 1 or 2 days for example. In this case the retraction signal may be generated to prevent electrical power consumption by the cell phone charger 11 that has been left unattended. Further, the retraction signal may be generated after a predetermined period of time to unplug the cell phone charger 11 from an electrical outlet in order to prevent an electrical safety hazard for minor children who are near the cell phone charger 11.

When the retraction signal is generated, the prongs are retracted due to a force by the rack gear spring 302. Therefore, the retraction of the prongs results in the prongs and the cell phone charger 11 getting unplugged from the electrical outlet, and the prongs of the cell phone charger 11 being retracted and contained fully inside the charger body 101.

Figure 4:
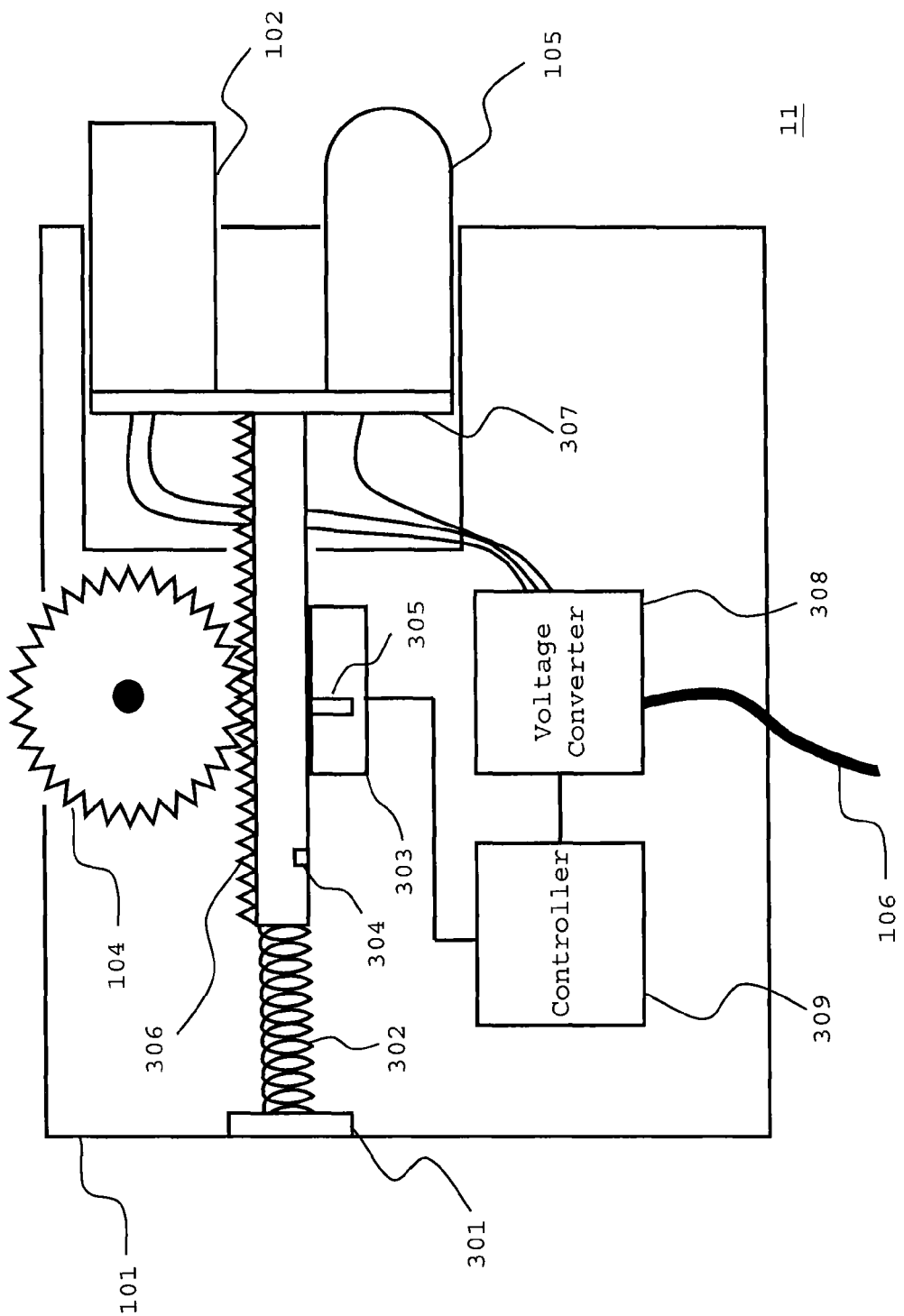
FIG. 4 is a cross sectional side view of an exemplary embodiment of a cell phone charger with a prong retraction mechanism in a partially extended position in accordance with present application.

FIG. 4 is a side cross sectional view of an exemplary embodiment of the cell phone charger 11 with a prong retraction mechanism in the partially extended position. When the retraction activator 303 initiates retraction of the prongs, the prongs are pulled back by the rack gear spring 302.

Figure 5:
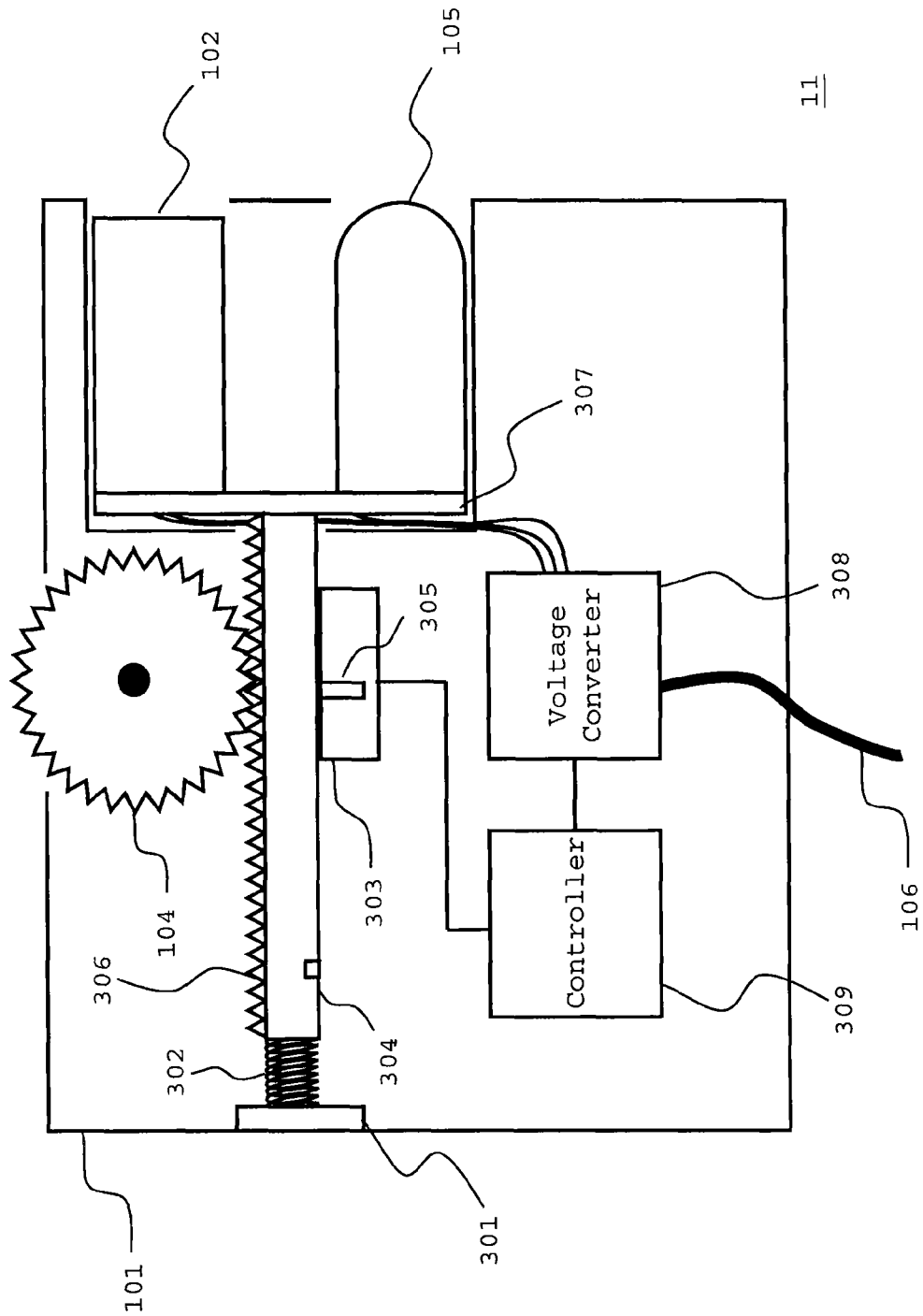
FIG. 5 is a cross sectional side view of an exemplary embodiment of a cell phone charger with a prong retraction mechanism in a retracted position in accordance with present application.

FIG. 5 illustrates the cell phone charger 11 when the prongs are in the fully retracted position. In this case, the prongs are fully retracted and contained in the charger body 101. In order to re-plug the cell phone charger 11, which is in the fully retracted position, the prongs need to be extended and locked in the fully extended position. The extension gear 104 can be used to manually extend the rack gear 306 to the fully extended position. A rotation of the extension gear 104 results in a linear movement of the rack gear 306. When the rack gear 306 is placed in the fully extended position, the rack gear hole 304 is aligned with the lock pin 305 and the lock pin 305 can be engaged with the rack gear hole 304. In this case, the lock pin 305 is engaged with the rack gear hole 304 as soon as the lock pin 305 is aligned with the rack gear hole 304. Alternatively, the retraction activator 303 can activate the lock pin 305 as soon as the lock pin 305 is aligned with the rack gear hole 304.

Figure 6:
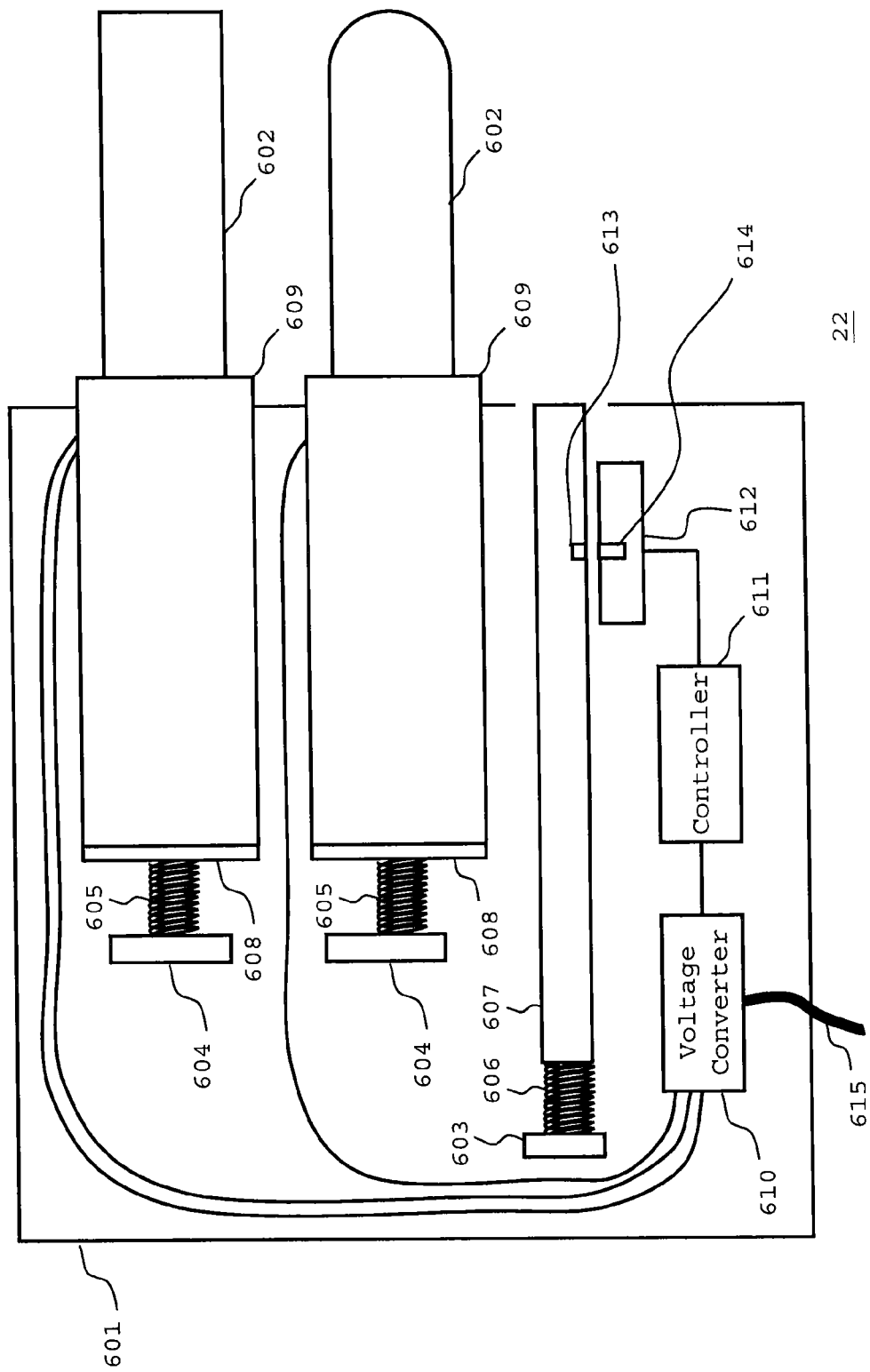
FIG. 6 is a cross sectional side view of a second exemplary embodiment of a cell phone charger with a protrusion mechanism where a protrusion lever and prong covers are in a fully retracted position.

FIG. 6 is a cross sectional side view of a second exemplary embodiment of a cell phone charger 22 with a protrusion mechanism where a protrusion lever 607 and prong covers 609 are in a fully retracted position. The cell phone charger 22 can be plugged into an electrical outlet, and can be used to charge a cell phone. The cell phone charger 22 can physically remove itself or unplug itself from the electrical outlet when one or more situations occur using the protrusion lever 607. Examples of the one or more situations include, but are not limited to, the cell phone being fully charged, a predetermined period of time having passed, and/or a predetermined threshold temperature or humidity being detected.

The cell phone charger 22 includes a charger body 601, a charger cable 615, a plurality of prongs 602, the protrusion lever 607, a spring 606, a spring base 603, a voltage converter 610, a controller 611, a protrusion activator 612, a lock pin 614, and a protrusion lever hole 613. Further, each one of the plurality of prongs 602 is associated with a prong cover 609, a prong cover base 608, a prong cover spring 605, and a cover spring base 604. In this exemplary embodiment, the prongs 602 are assembled in a fixed position and the prongs 602 are not movable. Instead the prong covers 609 and the protrusion lever 607 can be retracted and extended.

The prong cover 609 is installed on a prong cover base 608. The prong cover 609 and the prong cover base 608 are made of electrical insulator materials. The prong cover base 608 is connected to the prong cover spring 605. The prong cover spring 605 is connected to the prong cover base 608 at one end and to the cover spring base 604 at the other end. The prong cover spring 605 is fixed to the prong cover base 608 at the one end. When the prong cover 609 is in the retracted position, i.e. the prong cover 609 is inside of the charger body 601, the prong cover spring 605 pushes the prong cover 609 to place the prong cover 609 in the extended position, in which the prong cover 609 is outside of the charger body 601. It should be noted that the cell phone charger 22 shown in FIG. 6 illustrates the cell phone charger 22 that is fully plugged in an electrical outlet. As such, the electrical outlet pushes back the prong covers 609 inside the charger body 601.

The voltage converter 610 is connected to the prongs 602 via a plurality of cables. The voltage converter 610 receives the electrical power from the prongs and converts the AC power to a DC power that can be used by a cell phone for charging. The charger cable 615 connects the voltage converter 610 to a cell phone. Additionally, the voltage converter 610 may provide the electrical power for operation of the controller 611 of the cell phone charger 22. The controller 611 can control the protrusion activator 612. The protrusion lever 607 includes the protrusion lever hole 613 as shown in FIG. 6. The protrusion activator 612 includes the lock pin 614. The lock pin 614 is an electrically or an electromechanically controlled pin that can be engaged with the protrusion lever hole 613 of the protrusion lever 607. When the lock pin 614 is engaged with the protrusion lever hole 613, movement of the protrusion lever 607 is locked.

When the cell phone charger 22 is in the fully retracted position (FIG. 6), the prongs 602 are already inserted to an electrical outlet (the electrical outlet not shown). Plugging the cell phone charger 22 in to the electrical outlet results in the electrical outlet pushing back the prong covers 609 into the retraction position. As such, this exemplary embodiment provides an advantage that the prongs 602 of the cell phone charger 22 are always covered during the plugging and unplugging. This is important to prevent electrical shock as a result of the prongs 602 being touched while the plugging and unplugging of the cell phone charger 22.

In the fully retracted position, the lock pin 614 of the protrusion activator 612 is engaged with the protrusion lever hole 613 and prevents movement of the protrusion lever 607. In the fully retracted position, the spring 606 generates a force to push the protrusion lever 607 outside in order to unplug the cell phone charger 22 by pushing the cell phone charger 22 via the protrusion lever 607 against the electrical outlet. However, since the lock pin 614 is engaged with the protrusion lever hole 613, the protrusion lever 607 is locked and may not move. Therefore, the prongs 602 remain plugged in the electrical outlet.

The lock pin 614 can be released only when the protrusion activator 612 receives a protrusion signal from the controller 611 and unlocks the lock pin 614. The controller 611 generates the protrusion signal to disconnect the cell phone charger 22 from the electrical outlet. The protrusion signal may be generated, for example, when a cell phone that is being charged with the cell phone charger 22 is fully charged or is charged to a predetermined level, preferably %80, %90, or %95. Also, the protrusion signal may be generated when a hazardous situation occurs. That is, for example, when an electrical circuit of the cell phone charger 22 is short circuited, when the cell phone charger 22 gets hot (hot being defined by a predetermined temperature, such as 150°, 160°, 170°, or higher temperatures), or when a water spill is detected by the controller 611 of the cell phone charger 22. Additionally, the protrusion signal may be generated when a predetermined period of time is passed since the charger first was plugged into an electrical outlet. For example, the protrusion signal may be generated when the cell phone charger 22 is connected to an electrical outlet for five to ten hours, or when the cell phone charger 22 is connected to an electrical outlet for a few days. In this case the protrusion signal may be generated to prevent electrical energy consumption by the cell phone charger 22 that is left unattended. Further, the protrusion signal may be generated after a predetermined period of time to unplug the cell phone charger 22 from an electrical outlet in order to prevent an electrical safety hazard for minor children who are near the cell phone charger 22.

When the protrusion signal is generated, the protrusion lever 607 is extended due to a force by the spring 606. The force by the spring 606 causes extension of the protrusion lever 607 that results in the protrusion lever 607 contacting the electrical outlet and forcing the cell phone charger 22 away from the electrical outlet. Therefore, the cell phone charger 22 gets unplugged from the electrical outlet. During the unplugging, the prong covers 609 are pushed toward the electrical outlet by the prong cover springs 605 and cover the prongs 602 during the unplugging. The controller 611 (as well as other controllers in other embodiments) includes a battery that provides power for the controller 611 when the cell phone charger is unplugged.

Figure 7:
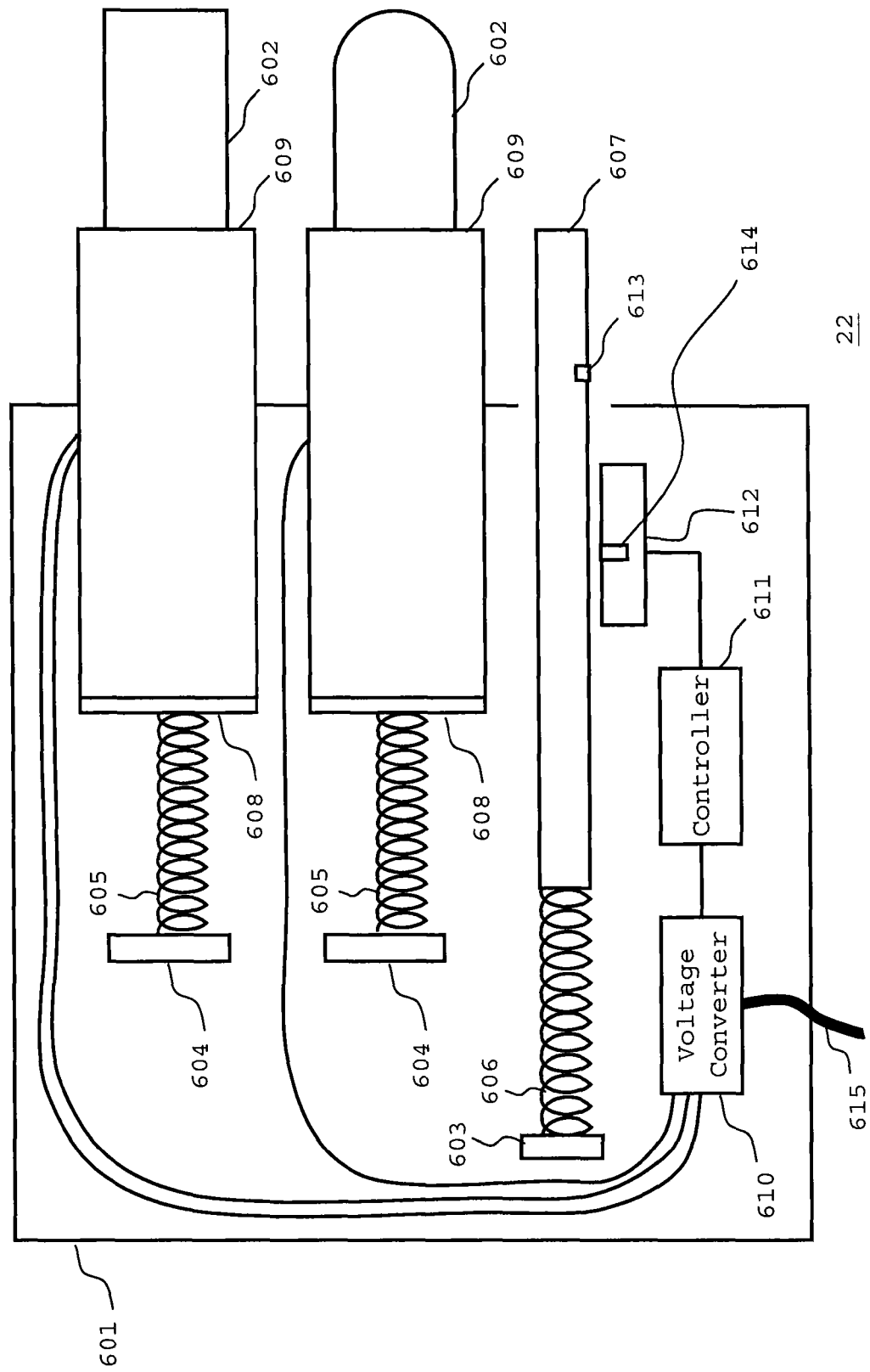
FIG. 7 is a cross sectional side view of a second exemplary embodiment of a cell phone charger with a protrusion mechanism where a protrusion lever and prong covers are in a partially extended position.

FIG. 7 is a cross sectional side view of an exemplary embodiment of the cell phone charger 22 with a protrusion mechanism in the partially extended position. When the protrusion activator 612 initiates extension of the protrusion lever 607, the protrusion lever 607 is pushed forward by the spring 606.

Figure 8:
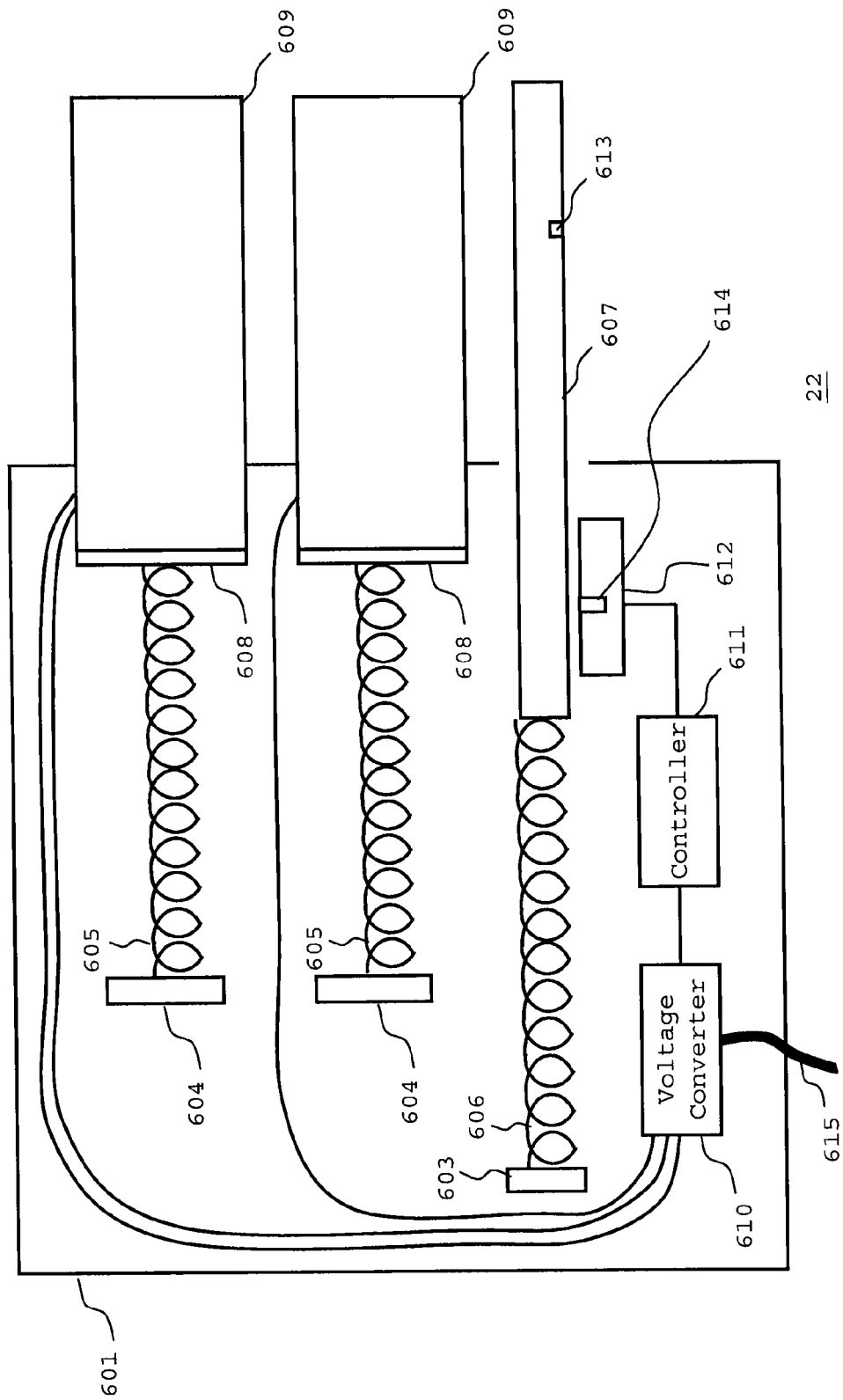
FIG. 8 is a cross sectional side view of a second exemplary embodiment of a cell phone charger with a protrusion mechanism where a protrusion lever and prong covers are in a fully extended position.

FIG. 8 illustrates the cell phone charger 22 when the protrusion lever 607 and the prong covers 609 are in the fully extended position. In this case, the protrusion lever 607 and the prong covers 609 are fully extended and the prongs 602 are fully contained in the prong covers 609.

In order to re-plug the cell phone charger 22 that is in the fully extended position and unplugged, the protrusion lever 607 and the prong covers 609 need to be pushed back to the retracted position. Additionally, the protrusion lever 607 needs to be locked in the fully retraction position. In this case, when the prongs 602 of the cell phone charger 22 are aligned to be plugged into the electrical outlet, pushing the cell phone charger 22 into the electrical outlet results in retraction of the protrusion lever 607 and the prong covers 609. When the cell phone charger 22 is fully inserted into the electrical plug, the protrusion lever 607 and the prong covers 609 are placed in the fully retracted position. Additionally, when the protrusion lever 607 is placed in the fully retracted position, the protrusion lever hole 613 is aligned with the lock pin 614 and the lock pin 614 can be engaged with the protrusion lever hole 613. In this case, the lock pin 614 can be engaged with the protrusion lever hole 613 as soon as the lock pin 614 is aligned with the protrusion lever hole 613, or the protrusion activator 612 can activate the lock pin 614 such that the lock pin 614 is engaged with the protrusion lever hole 613 as soon as the lock pin 614 is aligned with the protrusion lever hole 613. It should be noted that the force that the prong cover springs 605 provide to the electrical outlet via the prong covers 609 is smaller than a force required to unplugging the cell phone charger 22.

Figure 9:
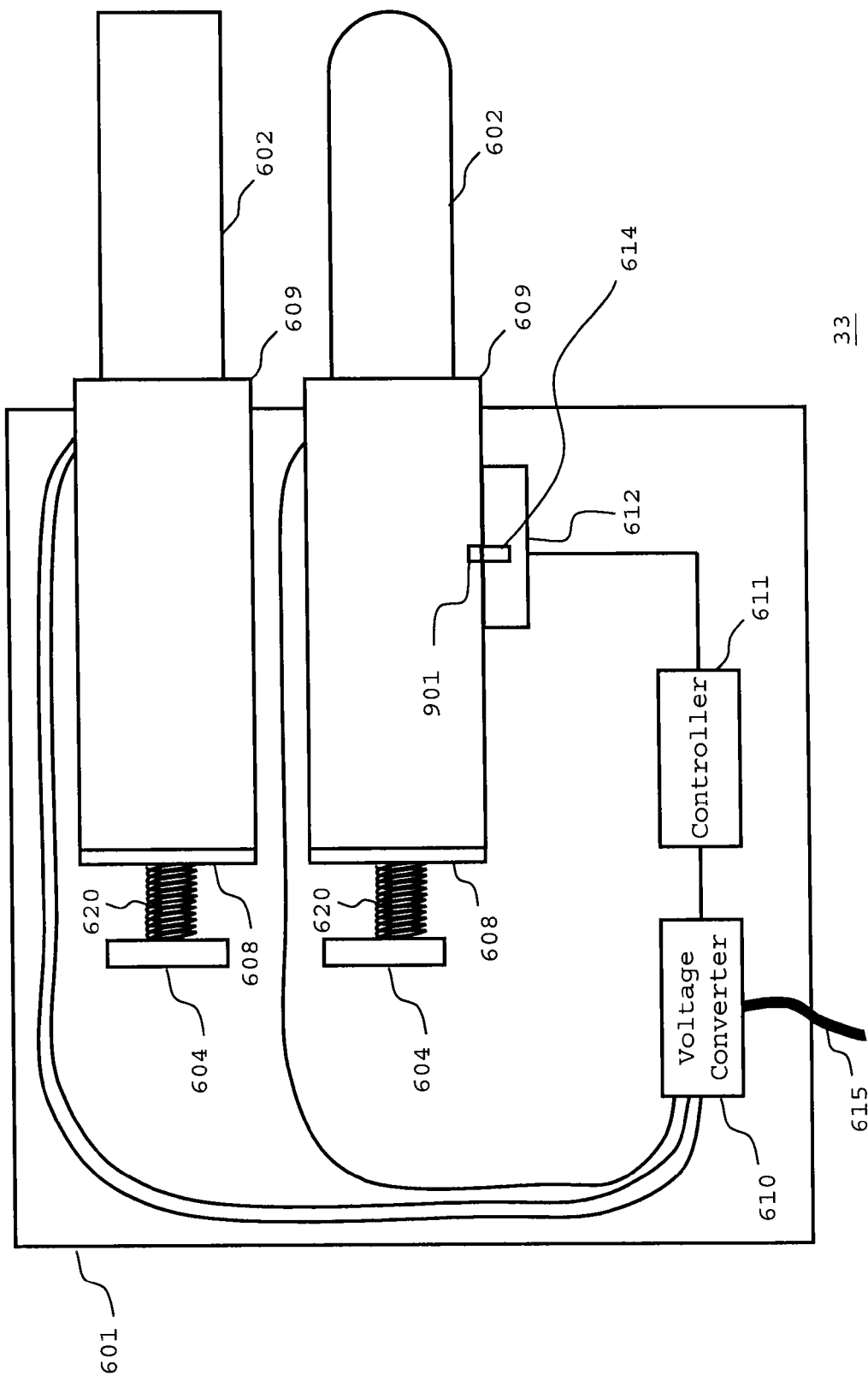
FIG. 9 is a cross sectional side view of a third exemplary embodiment of a cell phone charger with a protrusion mechanism where prong covers are in a fully retracted position.

FIG. 9 is a cross sectional side view of a third exemplary embodiment of a cell phone charger 33 with a protrusion mechanism where prong covers 609 are in a fully retracted position. In this exemplary embodiment, that is similar to the second embodiment discussed above, the prong covers 609 function both for covering the prongs 602 and also for pushing the cell phone charger 33 out of an electrical outlet. As such, in this exemplary embodiment, instead of using the protrusion lever 607, the prong covers 609 function as the protrusion lever 607. It should be noted that the force that the prong cover springs 620 provide to the electrical outlet via the prong covers 609 is adequate to force the cell phone charger 33 outside of the electrical outlet.

In the fully retracted position, the lock pin 614 of the protrusion activator 612 is engaged with the prong cover hole 901 and prevents movement of the prong covers 609. In the fully retracted position, the prong cover spring 620 generates a force to push the prong covers 609 outside in order to unplug the cell phone charger 33 by pushing the cell phone charger 33 against the electrical outlet. However, since the lock pin 614 is engaged with the prong cover hole 901, the prong covers 609 is locked and may not move. Therefore, the prongs 602 remain plugged in the electrical outlet.

Figure 10:
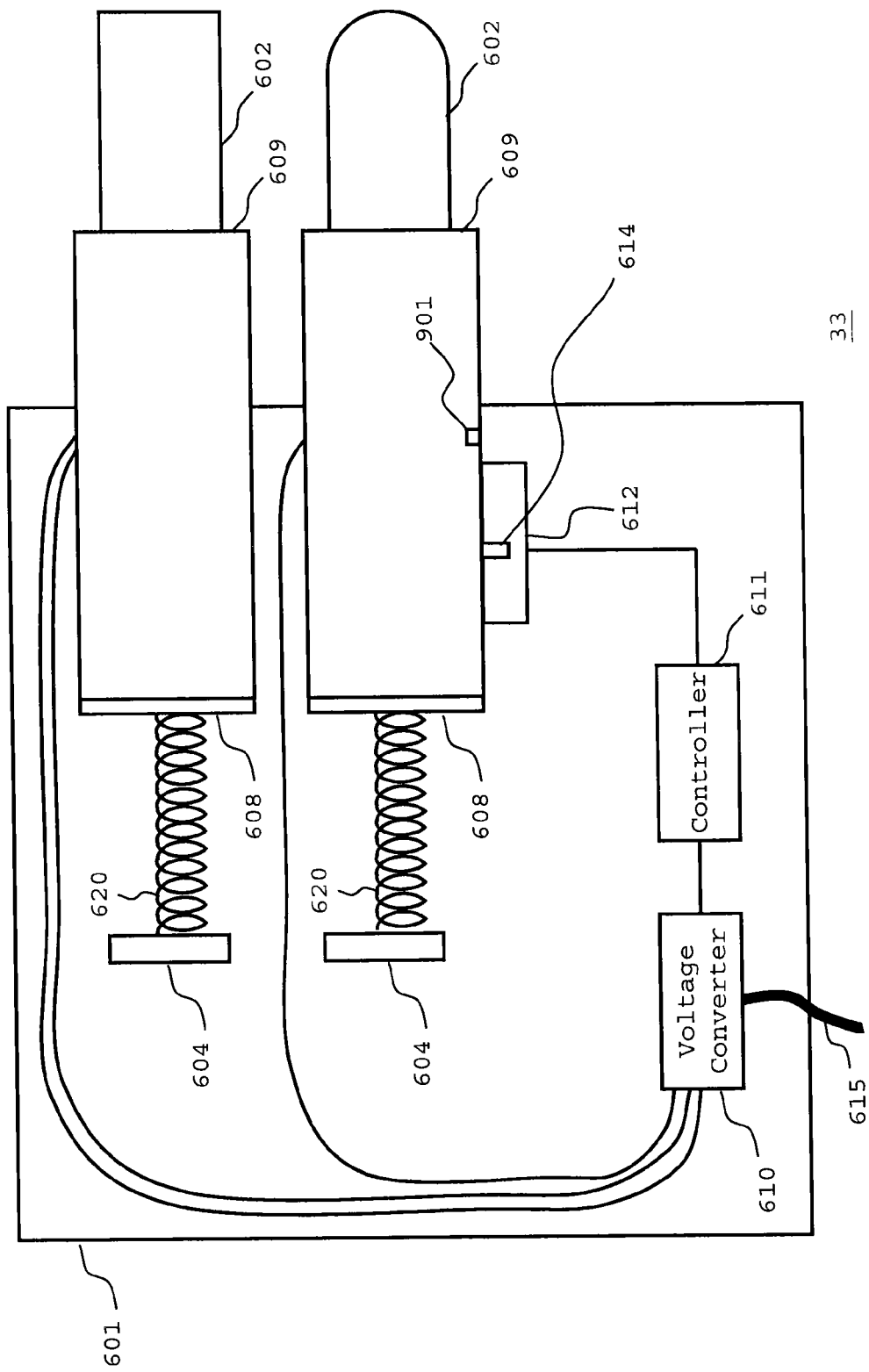
FIG. 10 is a cross sectional side view of a third exemplary embodiment of a cell phone charger with a protrusion mechanism where prong covers are in a partially extended position.

FIG. 10 is a cross sectional side view of the third exemplary embodiment of the cell phone charger 33 with a protrusion mechanism when the prong covers 609 are in the partially extended position. When the protrusion activator 612 initiates extension of the prong covers 609, the prong covers 609 are pushed forward by the prong cover springs 620.

Figure 11:
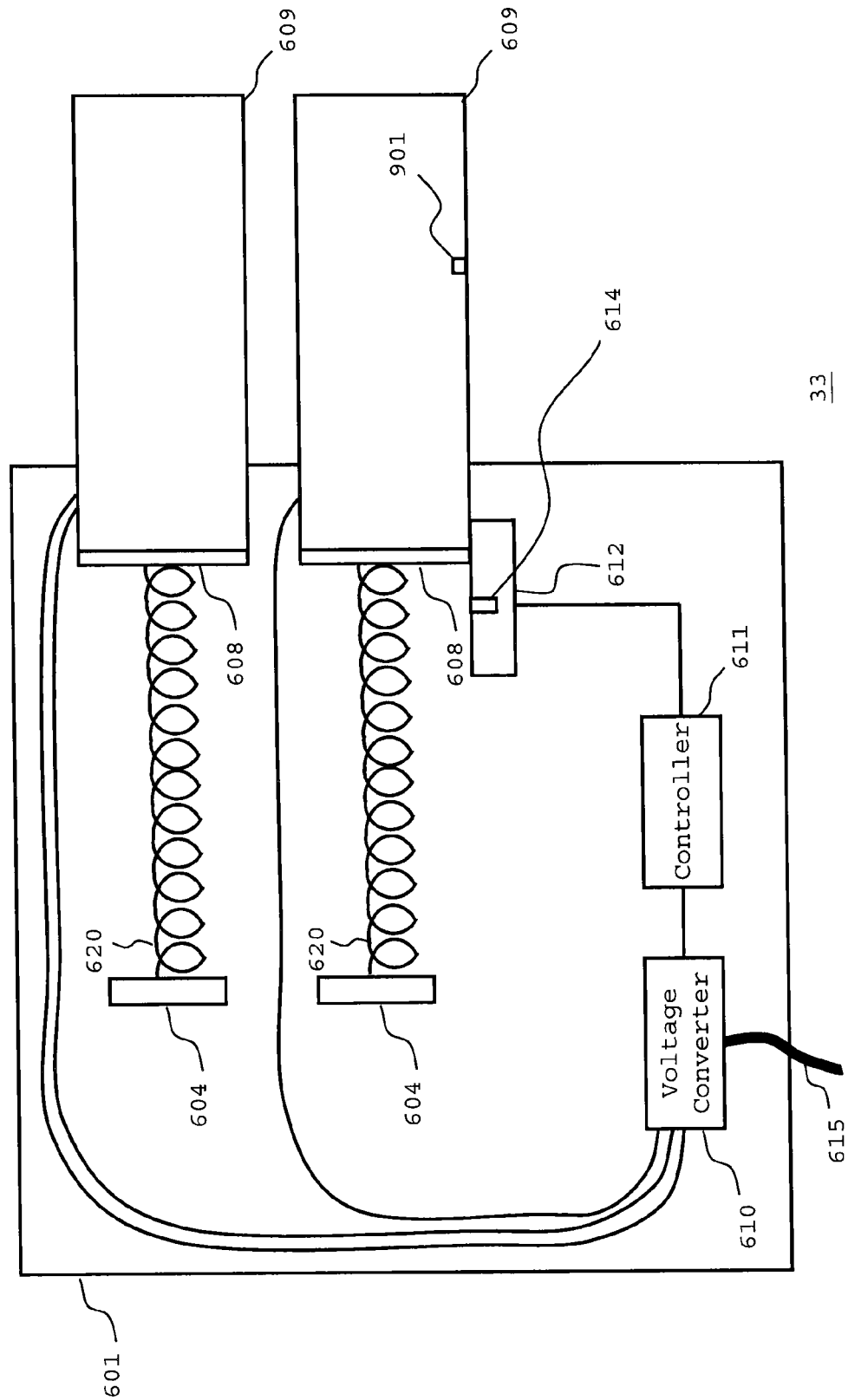
FIG. 11 is a cross sectional side view of a third exemplary embodiment of a cell phone charger with a protrusion mechanism where prong covers are in a fully extended position.

FIG. 11 illustrates the cell phone charger 33 when the prong covers 609 are in the fully extended position. In this case, the prong covers 609 are fully extended and the prongs 602 are fully contained in the prong covers 609. The extension of the prong covers 609 unplugs the cell phone charger 33 from the electrical outlet. Re-plugging the cell phone charger 33 that is in the fully extended position and unplugged is similar to the re-plugging of the second embodiment.

Figure 12:
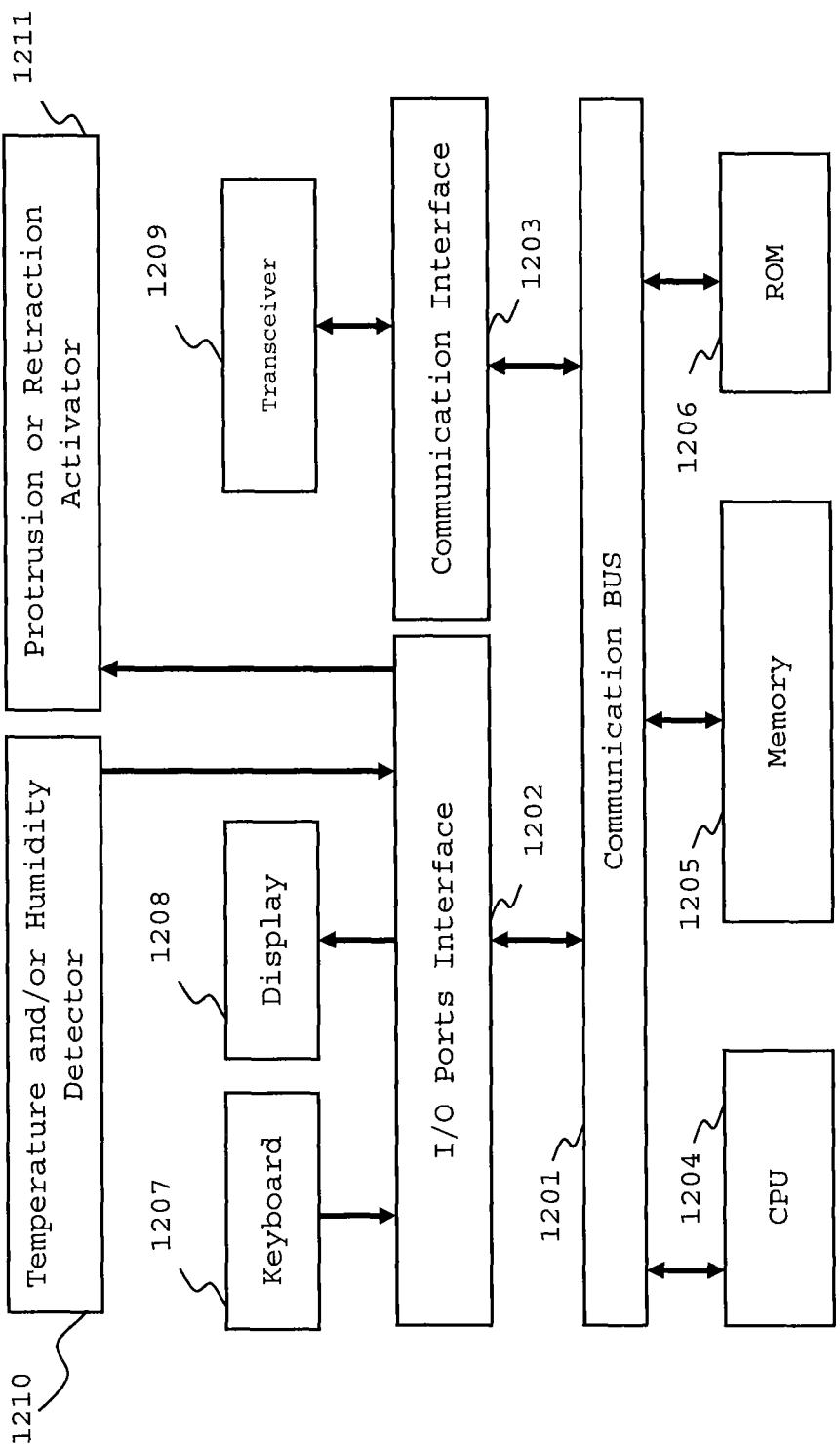
FIG. 12 is a block diagram of an exemplary controller of a cell phone charger.

FIG. 12 is a block diagram of an exemplary controller of a cell phone charger as described in this application with respect to the different exemplary embodiments. The controller includes a CPU 1204. The controller includes circuitry (one or more circuits). The settings data and instructions for controlling the cell phone chargers as described in this application can be stored in a memory 1205. The controller includes a communication interface 1203 that connects to a transceiver 1209 for interfacing with a network. The network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G, and 4G wireless cellular systems. The wireless network can also be WiFi, Bluetooth, or any other wireless form of communication that is known. The transceiver 1209 transmits and receives information with regards to the settings for the cell phone charger and information with regards to the an status of the cell phone charger and a charging status of a cell phone being charged with the cell phone charger.

The controller further includes a display 1207, such as a small LCD display, a display made from seven segment diode elements, or a touch screen display. An I/O ports interface 1202 interfaces with a keyboard 1207 and the display 1207. I/O ports interface 1202 also connects to a temperature or a humidity detector 1210, and a protrusion or a retraction activator 1211. Further, it should be noted that the controller includes an internal timer and when the cell phone charger is plugged into the electrical outlet, the controller resets the timer. Alternatively, the controller may have a second timer that is reset when a cell phone is connecter to the cell phone charger for charging.

A communication bus 1201 interconnects all of the components of the controller. A description of the general features and functionality of the display 1208, keyboard 1207, Memory 1205, ROM 1206, the I/O ports interface 1202 is omitted herein for brevity as these features are known.

Although the foregoing description is directed to the preferred embodiments, it is noted that other variations and modifications will be apparent to those skilled in the art, and may be made without departing from the spirit or scope of this application. Moreover, features described in connection with one embodiment of the invention may be used in conjunction with other embodiments, even if not explicitly stated above.

The invention claimed is:

1. A cell phone charger that charges a cell phone, said cell phone charger comprising:
   a plurality of conductive prongs that are configured to be plugged into an electrical outlet to provide an electrical connection between said cell phone charger and an AC power source, said plurality of conductive prongs being retractable prongs;
   a prong base on which said plurality of conductive prongs are disposed, said prong base being made of an electrical insulator;
   a rack gear that is connected to said prong base having a rack gear hole;
   an extension gear that is engaged with said rack gear, said extension gear is rotated to move said rack gear between a retracted position and an extended position;
   a spring that is connected to said rack gear at one end and to a spring base at another end, and that provides a force to place said rack gear in said retracted position;
   a lock pin that is positioned to be engaged with said rack gear hole and lock said rack gear in said extended position;
   a retraction activator that controls said lock pin based on a retraction signal;
   a controller that generates said retraction signal and transmits said retraction signal to said retraction activator, and that detects a charging status of said cell phone; and
   a voltage converter that converts an AC voltage from said AC power source to a DC voltage and charges said cell phone with said DC voltage when said plurality of conductive prongs are plugged into said electrical outlet.

2. The cell phone charger according to claim 1, further comprising:
   a keyboard that receives user-input commands corresponding to a plurality of settings;
   a display that displays said plurality of settings;

a temperature sensor that detects a temperature of said cell phone charger;
a humidity detector that detects a humidity of said cell phone charger; and
a transceiver that transmits and receives said charging status of said cell phone.

3. The cell phone charger according to claim 2, wherein upon determination by said controller that said temperature of said cell phone charger is above a predetermined temperature, or said humidity of said cell phone charger is above a predetermined humidity, said controller generates said retraction signal and transmits the retraction signal to said retraction activator.

4. The cell phone charger according to claim 2, wherein upon determination by said controller that a time duration is greater than a predetermined time duration, said controller generates said retraction signal and transmits the retraction signal to said retraction activator.

5. The cell phone charger according to claim 2, wherein upon said retraction activator receiving said retraction signal from said controller, said retraction activator places said lock pin in a locked position such that said lock pin is engaged with said rack gear hole.

6. The cell phone charger according to claim 2, wherein upon said rack gear being in said extended position and said lock pin being engaged with said rack gear hole, said plurality of conductive prongs are locked,
upon said rack gear being in said extended position and said lock pin not being engaged with said rack gear hole, said plurality of conductive prongs are not locked and said spring urges said rack gear to retract said plurality of conductive prongs, and
upon said retraction activator receiving said retraction signal and unlocking said lock pin, said rack gear and said plurality of conductive prongs are retracted to unplug said cell phone charger.

7. The cell phone charger according to claim 2, wherein said controller includes a transceiver that transmits the charging status of the cell phone to another cell phone, a smart phone, or a personal computer.

8. A cell phone charger that charges a cell phone, said cell phone charger comprising:
a plurality of conductive prongs that are configured to be plugged into an electrical outlet to provide an electrical connection between said cell phone charger and an AC power source;
a plurality of prong covers that are configured to cover said plurality of conductive prongs, said plurality of prong covers are retractable and are made of an electrical insulator, and each one of said plurality of prong covers cover each one of said plurality of conductive prongs;
a plurality of prong cover springs that are configured to push said plurality of prong covers to an extended position such that in said extended position, each of said plurality of prongs is fully contained in each of said plurality of prong covers;
a protrusion lever that pushes against said electrical outlet to unplug said cell phone charger, said protrusion lever having a protrusion lever hole;
a spring that is connected to said protrusion lever at one end and to a spring base at another end, said spring provides a force to place said protrusion lever in said extended position;
a lock pin that is positioned to be engaged with said protrusion lever hole and lock said protrusion lever in a retracted position;
an extension activator that controls said lock pin based on an extension signal;
a controller that generates said extension signal and transmits said extension signal to said extension activator, and that detects a charging status of said cell phone; and
a voltage converter that converts an AC voltage from said AC power source to a DC voltage and charges said cell phone with said DC voltage when said plurality of conductive prongs are plugged into said electrical outlet.

9. The cell phone charger according to claim 8, further comprising:
a keyboard that receives user-input commands corresponding to a plurality of settings;
a display that displays said plurality of settings;
a temperature sensor that detects a temperature of said cell phone charger;
a humidity detector that detects a humidity of said cell phone charger; and
a transceiver that transmits and receives said charging status of said cell phone.

10. The cell phone charger according to claim 9, wherein upon determination by said controller that said temperature of said cell phone charger is above a predetermined temperature, or said humidity of said cell phone charger is above a predetermined humidity, said controller generates said extension signal and transmits the extension signal to said extension activator.

11. The cell phone charger according to claim 9, wherein upon determination by said controller that a time duration is greater than a predetermined time duration, said controller generates said extension signal and transmits the extension signal to said extension activator.

12. The cell phone charger according to claim 9, wherein upon said extension activator receiving said extension signal from said controller, said retraction activator places said lock pin in a locked position such that said lock pin is engaged with said protrusion lever hole.

13. The cell phone charger according to claim 9, wherein upon said protrusion lever being in said retracted position and said lock pin being engaged with said protrusion lever hole, said protrusion lever is locked,
upon said protrusion lever being in said retracted position and said lock pin not being engaged with said protrusion lever hole, said protrusion lever is not locked and said spring urges said protrusion lever to extend, and
upon said extension activator receiving said extension signal and unlocking said lock pin, said protrusion lever is extended to unplug said cell phone charger.

14. The cell phone charger according to claim 9, wherein said controller includes a transceiver that transmits the charging status of the cell phone to another cell phone, a smart phone, or a personal computer.

15. A cell phone charger that charges a cell phone, said cell phone charger comprising:
a plurality of conductive prongs that are configured to be plugged into an electrical outlet to provide an electrical connection between said cell phone charger and an AC power source;
a plurality of prong covers that is configured to cover said plurality of conductive prongs, said plurality of prong covers are retractable and are made of an electrical insulator, and each one of said plurality of prong covers cover each one of said plurality of prongs;
a plurality of prong cover springs that push said plurality of prong covers to an extended position such that in said extended position, each of said plurality of conductive prongs is fully contained in each of said plurality of said prong covers, and at least of one said plurality of prong covers having a prong cover hole;

a lock pin that is positioned to be engaged with said prong cover hole and lock one of said plurality of prong covers in a retracted position;

an extension activator that controls said lock pin based on an extension signal;

a controller that generates said extension signal and transmits said extension signal to said extension activator, and that detects a charging status of said cell phone; and a voltage converter that converts an AC voltage from said AC power source to a DC voltage and charges said cell phone with said DC voltage when said plurality of conductive prongs are plugged into said electrical outlet.

16. The cell phone charger according to claim 15, further comprising:

a keyboard that receives user-input commands corresponding to a plurality of settings;

a display that displays said plurality of settings;

a temperature sensor that detects a temperature of said cell phone charger;

a humidity detector that detects a humidity of said cell phone charger; and a transceiver that transmits and receives said charging status of said cell phone.

17. The cell phone charger according to claim 16, wherein upon determination by said controller that said temperature of said cell phone charger is above a predetermined temperature, or said humidity of said cell phone charger is above a predetermined humidity, said controller generates said extension signal and transmits the extension signal to said extension activator, and upon determination by said controller that a time duration is greater than a predetermined time duration, said controller generates said extension signal and transmits the extension signal to said extension activator.

18. The cell phone charger according to claim 16, wherein upon said extension activator receiving said extension signal from said controller, said retraction activator places said lock pin in a locked position such that said lock pin is engaged with one of said plurality of prong covers.

19. The cell phone charger according to claim 16, wherein upon said plurality of prong covers being in said retracted position and said lock pin being engaged with said prong cover hole, said plurality of prong covers are locked, upon said plurality of prong covers being in said retracted position and said lock pin being not engaged with said prong cover hole, said plurality of prong covers are not locked and said plurality of prong cover springs urge said plurality of prong covers to extend, and upon said extension activator receiving said extension signal and unlocking said lock pin, said plurality of prong covers are extended to unplug said cell phone charger.

20. The cell phone charger according to claim 16, wherein said controller includes a transceiver that transmits the charging status of the cell phone to another cell phone, a smart phone, or a personal computer.

\* \* \* \* \*